May 17, 1927.
B. MacNUTT
1,629,221
RECORDING SCALE
Filed July 9, 1925
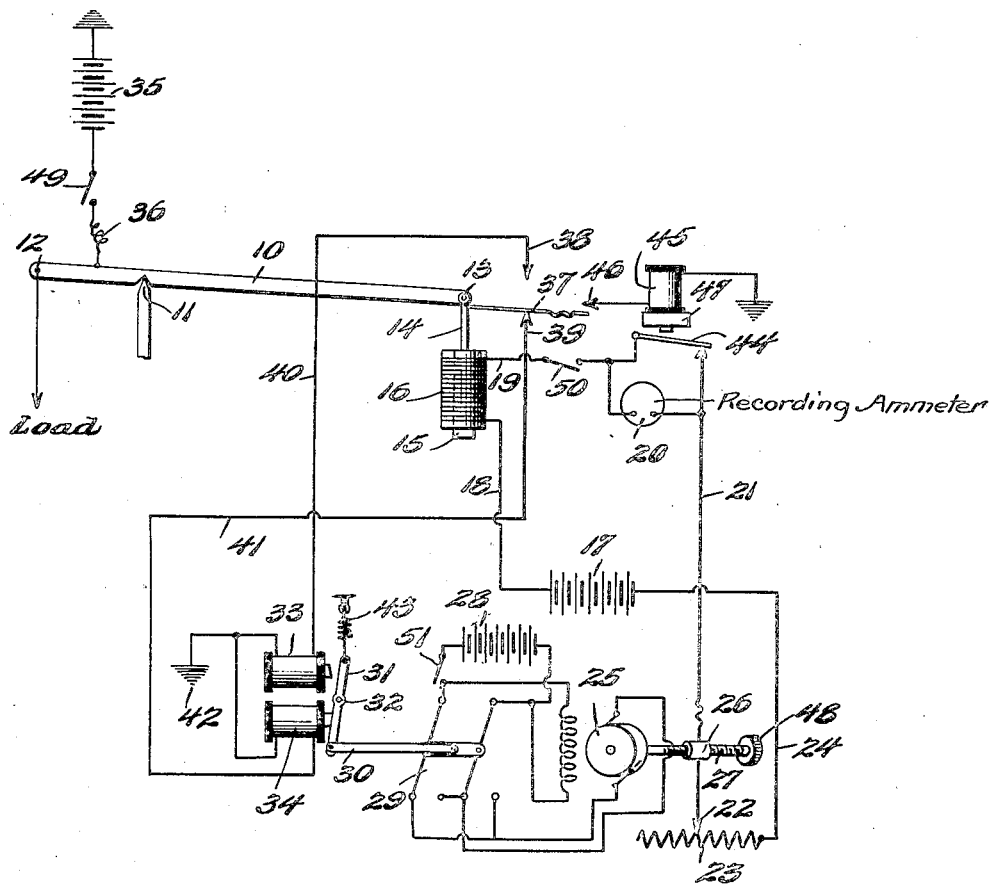
Inventor
Barry MacNutt,
By Joseph W. Hazell
Attorney Patented May 17, 1927.

1,629,221

UNITED STATES PATENT OFFICE.

BARRY MacNUTT, OF GLOUCESTER, MASSACHUSETTS.

RECORDING SCALE.

Application filed July 9, 1925. Serial No. 42,493.

This invention relates to weighing apparatus and more particularly to automatic, recording, weighing devices of the electric type.

It is a general object of the present invention to provide a novel and improved form of apparatus for rapidly and automatically determining and recording the weight of various objects, particularly such things as loaded freight and coal cars.

More particularly it is an object of the present invention to provide a weighing device in which the load is balanced by an electro-magnet.

Another object of this invention consists in the provision of a weighing device in which the load is automatically balanced by an electro-magnet, the exciting current of which is adjusted according to the position of the scale beam.

A further object of the present invention consists in the provision of a recording ammeter in the circuit of the balancing magnet of an automatic weighing device, together with means to prevent operation of said ammeter except upon the obtaining of an exact balance of the load.

Other and further objects of the invention will be apparent to those skilled in the art after a consideration of the attached drawing and following specification wherein is disclosed a single exemplary embodiment of the invention with the understanding, however, that various changes may be made in the details thereof without departing from the spirit of the invention or the scope of the attached claims.

In the drawing the single figure is a diagrammatic and schematic representation of an automatic, recording, weighing device according to the present invention.

For rapidly weighing and recording the weight of a large number of objects, an automatic weighing and recording scale is highly desirable. It has heretofore been proposed to use electricity to apply and remove weights from the beam of a scale to automatically obtain a balance, but the present invention contemplates eliminating weights entirely and obtaining the balance electromagnetically.

Since the pull on the plunger of a solenoid is proportional to the magnetic field thereof and since this field is proportional to the current flowing in the windings, the current is therefore proportional to the load on one end of a beam, the other end of which supports the solenoid plunger, the beam being, of course, fulcrumed between the ends. With this in mind, a scale can be constructed as illustrated in the drawing, wherein 10 is the beam of a scale fulcrumed in any suitable manner as at 11. The load may be applied to one end 12 of the beam in any well known manner such as, for instance, from a track platform. The opposite end of the beam has pivoted to it at 13 a link 14, which supports the core or plunger 15 operating within the solenoid 16. This solenoid is wound with a suitable number of turns of the proper size wire so that when energized by current from the source 17 it is able to attract the plunger 15 to balance any load within the capacity of the scale.

The source of current 17 is connected by wire 18 to the solenoid, the other terminal of which is connected by wire 19 to any suitable form of recording ammeter 20. The particular construction of this ammeter forms no part of the present invention, but it is preferred to have it calibrated in pounds rather than amperes, which can be readily done. A wire 21 leads from the ammeter to a movable contact 22 which is adapted to slide along and contact with the turns of the rheostat or resistance 23 to adjust the flow of current through the winding of the solenoid. A wire 24 completes the circuit of the solenoid.

In order to automatically move the contact 22 to adjust the current in the solenoid to effect a balance of the scale, it is mounted for movement by a reversible electric motor 25. Any desired method of moving the contact by means of the motor may be used, but for the sake of simplicity it is shown as mounted on a threaded sleeve 26 carried by the threaded shaft 27 extending from the motor 25.

The motor 25 is supplied with current from any suitable source, such as 28, through any conventional reversing switch such as 29 so that its direction of rotation can be changed at will.

To effect an automatic change of direction of the motor, the movable arms of the switch 29 are connected by a link 30 with one end of the armature 31 pivoted at its center as at 32 before a pair of electro-magnets 33 and 34, each adapted to act on one end thereof to thus move the switch arms to one or the other of their effective positions.

One of the other of the magnets is energized from the source of current 35 depending upon whether the beam 10 is in its maximum upper or lower position. The source of current 35 is grounded at one end and connected to the beam at the other by a flexible lead 36. The solenoid end of the beam, which is formed of conducting material, carries the contact spring 37 movable between the stationary contacts 38 and 39. The contacts are connected respectively by wires 40 and 41 with the windings of the magnets 33 and 34. The opposite ends of the windings of the magnets are grounded as at 42 or otherwise suitably connected back to the source 35.

From the above it will be seen that when the beam is in the position shown in the figure, the load is overbalanced by the pull of the solenoid and the spring 37 engages with the contact 39 to energize the magnet 34 from the source of current 35, thereby attracting the lower end of the armature 31 and through the link 30 moving the reversing switch to the position shown to thus drive the motor in such a direction as to move the contact 22 to the left and insert more resistance in the solenoid circuit to allow the plunger to rise to balance the load; when the circuit is broken between 37 and 39 and the armature 31, no longer influenced by the magnet 34, is returned to its neutral position by the spring 43, thus stopping the motor 25.

In case the load placed on the platform is greater than the one previously weighed, the left end of the beam will be pulled down making contact between the spring 37 and the contact 38 to thus energize the magnet 33, thereby attracting the upper end of the armature 31 and starting the motor 25 in such a direction as to reduce the resistance in the solenoid circuit until a balance is obtained when the motor will be stopped as before by the spring 37 being drawn away from the contact 38.

The recording ammeter normally has its winding shunted by the armature 44 of the relay 45 as shown, in order that during the balancing operation, it is prevented from recording. However, upon obtaining a balance the spring 37 engages the contact 46 to thus energize the relay 45 from the source of current 35 thus lifting the armature 44 and placing the winding of the recording ammeter 20 in the solenoid circuit to cause it to record the weight on the scale platform.

Since there may be some fluctuation of the beam before a balance is obtained, the relay 45 is made slow pull-up, such as by the slug of copper 47 on its core so that it will not act to allow a recording of weight upon a mere passage of the spring 37 over the contact 46.

If it should be found desirable, the balance may be obtained by hand by turning the knob 48 on the end of the screw 27 to regulate the amount of resistance 23 in the solenoid circuit. Whichever process is used, however, it is only necessary to have the solenoid and beam contacts at the scale, the other parts of the device being capable of being operated remotely from the platform.

If desired, switches 49, 50 and 51 may be placed in the several circuits so that they can be deenergized when the device is not in use.

What is claimed is:

1. Automatic weighing apparatus comprising, in combination, a beam fulcrumed between its ends, means to apply an article to be weighed to one end of said beam, a magnetic core secured to the other end of said beam, a solenoid winding surrounding said core, a source of electricity connected in circuit with said winding, an adjustable resistance in said circuit, means to adjust said resistance to balance the load on said beam by electromagnetic attraction of said core, a recording ammeter and means to connect said ammeter in said circuit upon the obtaining of a balance.

2. Automatic weighing apparatus comprising, in combination, a beam fulcrumed between its ends, means thereon to support an article to be weighed, a magnetic core secured to said beam at the opposite side of said fulcrum from said supporting means, a solenoid winding surrounding said core, a source of electricity connected in circuit with said winding, a contact movable with said beam, a stationary contact adapted to be engaged by said movable contact at the limit of movement of said beam in one direction, a second stationary contact adapted to be engaged by said movable contact at the other limit of movement of said beam, a circuit for each stationary contact adapted to be closed by said movable contact, means controlled by each circuit to respectively increase and decrease the flow of current in said solenoid circuit to adjust the electromagnetic attraction of said solenoid to balance said beam, current recording means in said solenoid circuit and means to render said recording means ineffective except upon occurrence of a balance of said beam.

3. Automatic weighing apparatus comprising, in combination, a fulcrumed beam, means at one end thereof to support an article to be weighed, a magnetic core at the opposite end thereof, a solenoid winding surrounding said core, a source of electricity connected in circuit with said winding, a contact movable with said beam, a pair of stationary contacts, each adapted to be engaged by said movable contact at one of the limits of movement of said beam, a circuit including a source of energy and said movable contact for each stationary contact, a magnet in each circuit, an armature biased to a normal position and adapted to be moved by either magnet from said normal position, an adjustable resistance in said solenoid circuit, a reversible motor adapted to adjust said resistance, a source of energy and a reversing switch for said motor, said switch being operatively connected to said armature, a recording ammeter in said solenoid circuit, a relay, an armature therefor normally shunting said ammeter, a third stationary contact adapted to be engaged by said movable contact at the balance position of said beam and a circuit connecting said contact and relay to a source of electricity whereby said shunt is removed from said ammeter only when the electromagnetic attraction of said solenoid balances said beam.

4. Automatic weighing apparatus comprising, in combination, a fulcrumed beam, means at one end thereof to support an article to be weighed, a magnetic core at the opposite end thereof, a solenoid winding surrounding said core, a source of electricity connected in circuit with said winding, a contact movable with said beam, a pair of stationary contacts, each adapted to be engaged by said movable contact at one of the limits of movement of said beam, a circuit including a source of energy and said movable contact for each stationary contact, a magnet in each circuit, an armature biased to a normal position and adapted to be moved by either magnet from said normal position, an adjustable resistance in said solenoid circuit, a reversible motor adapted to adjust said resistance, a source of energy and a reversing switch for said motor, said switch being operatively connected to said armature, a recording ammeter in said solenoid circuit, a relay, an armature therefor normally shunting said ammeter, a third stationary contact adapted to be engaged by said movable contact at the balance position of said beam and a circuit connecting said contact and relay to a source of electricity whereby said shunt is removed from said ammeter only when the electromagnetic attraction of said solenoid balances said beam, said relay being slow acting.

In testimony whereof I affix my signature.

BARRY MacNUTT.